Jan. 17, 1933.  L. R. WILLIAMSON  1,894,434
HYDRAULIC CONTROL DEVICE
Filed Oct. 27, 1930   2 Sheets-Sheet 1

Inventor
Larkin R. Williamson,
By Owen + Owen
Attorneys

Jan. 17, 1933.   L. R. WILLIAMSON   1,894,434
HYDRAULIC CONTROL DEVICE
Filed Oct. 27, 1930   2 Sheets-Sheet 2
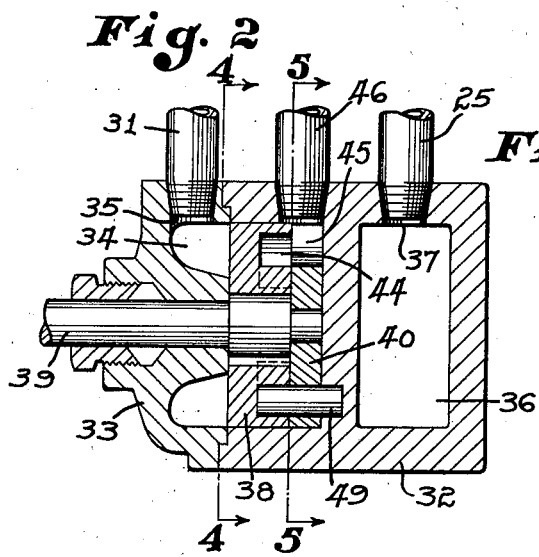
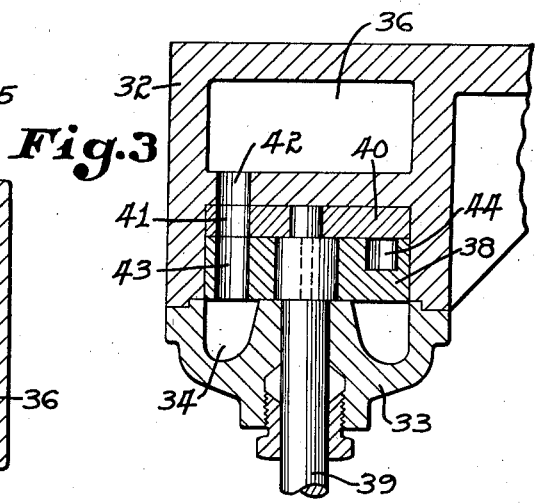
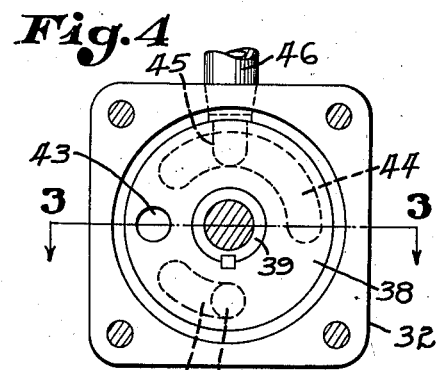
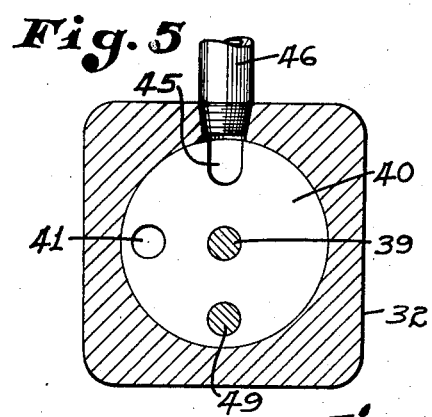
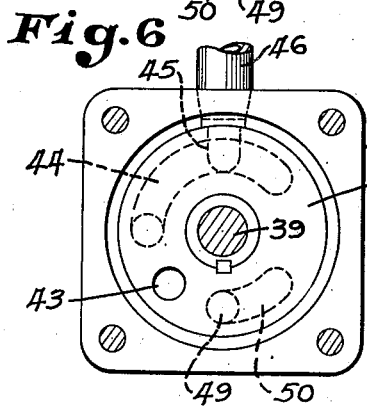
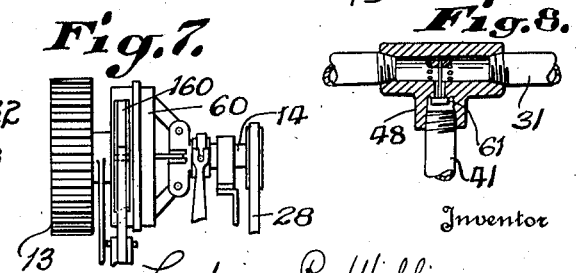
Inventor
Larkin R. Williamson
By Owen & Owen
Attorneys Patented Jan. 17, 1933

1,894,434

UNITED STATES PATENT OFFICE

LARKIN R. WILLIAMSON, OF TOLEDO, OHIO, ASSIGNOR TO THE TOLEDO MACHINE & TOOL COMPANY, OF TOLEDO, OHIO, A CORPORATION OF OHIO

HYDRAULIC CONTROL DEVICE

Application filed October 27, 1930. Serial No. 491,388.

This invention relates to a hydraulic control device which, in its present embodiment, is adapted to be used in a power press or other power operated machine to control the operation of the brake.

The object of the invention is primarily to provide a self contained unit for the purpose stated, which may be operatively connected to power driven mechanism of the type now used, the pump for creating the hydraulic pressure being in the present instance driven from the same shaft which drives the mechanism to be controlled. Yieldable means may be provided for normally setting the brakes, and the hydraulic control device may be actuated, as desired, to release the same.

The present embodiment of the invention will be more particularly described in connection with the accompanying drawings, in which Figure 1 is an end elevation of power driven mechanism, with the invention associated therewith.

Figure 2 is an enlarged sectional detail view taken on the line 2—2 of Figure 1.

Figure 3 is a section taken on the line 3—3 of Figure 4.

Figure 4 is a section taken on the line 4—4 of Figure 2.

Figure 5 is a section taken on the line 5—5 of Figure 2.

Figure 6 is a view similar to Figure 4, but with the valve in a different position.

Figure 7 is a front elevation of the driving connection for the mechanism to be controlled.

Figure 8 is a detail view of a relief valve for the fluid pressure system.

Figure 1:
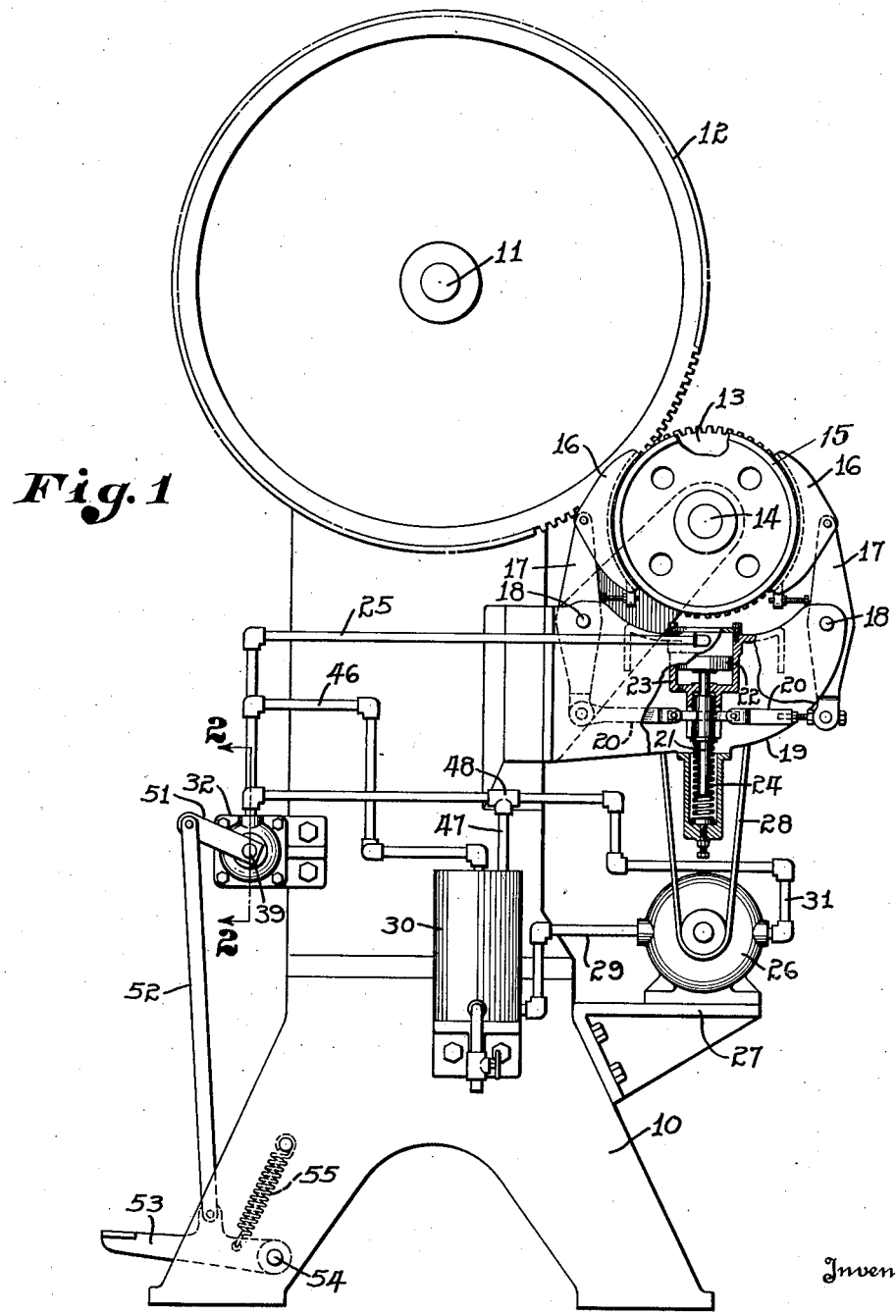

The mechanism with which the invention is associated is represented in Figure 1 as a power press having a frame 10 and a crank shaft 11 driven by gears 12 and 13. The gear 13 is secured to a power driven shaft 14 which also has a brake drum 15 secured thereto. The drum 15 is adapted to be engaged by brake shoes 16 carried by the upper ends of levers 17 which are fulcrumed at 18 in a frame 19 which constitutes an extension of the frame 10.

The brake shoes 16 are adapted to be forced into engagement with the drum 15 through the medium of toggle links 20 connected to the lower ends of the levers 17. The inner ends of the toggle links 20 are connected to a piston rod 21 having a head 22 adapted to reciprocate within a cylinder 23. A spring 24 normally holds the piston head 22 in the advanced position shown in Figure 1, with the toggle links 20 in alignment and the brake set. In order to release the brake, fluid pressure is introduced through a pipe 25 into the the upper end of the cylinder 23 to force the piston 22 downwardly, thus breaking the toggle and releasing the brake shoes 16 from contact with the drum 15.

The fluid pressure for releasing the brake is generated by a rotary pump 26 which is mounted on a base 27 secured to the frame 10 and is driven by a chain 28 or other driving connection from the shaft 14 which also drives the mechanism to be controlled. When the pump 26 is in operation it draws fluid through a pipe 29 from a tank 30 and discharges it through a pipe 31, which leads to a valve box 32.

The box 32 has a cap 33, within which is an annular chamber 34 having an inlet port 35 connected with the pipe 31. The box 32 also has a chamber 36 connected through a port 37 and the pipe 25 to the cylinder 23. A valve 38 secured to a shaft 39 mounted centrally of the cap 33 controls the communication between the chambers 34 and 36. The valve 38 rests against a seat 40 which is secured within the box 32 and has a port 41 in registry with a port 42 leading into the chamber 36. The valve 38 has a port 43 which registers with the ports 41 and 42, when the valve is in the position shown in Figures 2, 3, and 4, and thereby provides uninterrupted communication between the chambers 34 and 36. The valve 38 also has an arcuate channel 44 which has communication through a port 45 with a pipe 46 leading to the tank 30. When the valve 38 is moved to the position shown in Figure 6 the channel 44 opens communication from the chamber 36 to the pipe 46 and to the tank 30.

It will be seen, therefore, that with the valve 38 in the position shown in Figures 2, 3 and 4 and with the pump 26 operating, fluid will be forced through the pipe 31, valve 38 and pipe 25 into the upper end of the cylinder 23 to force the piston 22 downwardly in opposition to the spring 24, thereby breaking the toggle and releasing the brake. Normally the shaft 14 and pump 26 will operate continuously and, when the brake 16 is released, a clutch 60 may be engaged to drive the gears 13 and 12 and the shaft 11. Then, as long as the pump is driven, the brake will be held in released position unless the valve is shifted to interrupt the communication between the chambers 34 and 36, as is illustrated for example in Figure 6. In the latter position of the valve, the pressure from the pump through the pipe 31 will be cut off from the cylinder 23 and the fluid already in the cylinder will be permitted to flow backwardly through the pipe 25, port 37, chamber 36, ports 42 and 41, channel 44, port 45, and is returned through the pipe 46 to the tank 30, thus permitting the piston 22 to be lifted by the spring 24 to straighten the toggle 20 and set the brake.

Whenever the port 43 is closed as shown in Figure 6, with the pump still operating, the flow of fluid from the pump into the pipe 31 will be returned to the tank 30 by a branch pipe or by-pass 47 connected to the pipe 31 through a relief valve 61 in the T 48. This relief valve also prevents the development of excessive pressure in the line 25 and cylinder 23, when the valve 38 is in the position shown in Figures 2, 3 and 4.

The limit of movement of the valve 38 is determined by a dowel pin 49 set in the valve seat 45 and extending into an arcuate channel 50 formed in the valve. Any suitable means may be employed for shifting the valve 38 from one extreme position to the other. The means shown in Figure 1 for this purpose includes a crank arm 51 secured to the valve shaft 39 and connected by a link 52 to a treadle 53 pivotally connected at 54 to the frame 10. A coil spring 55 normally holds the treadle in its uppermost position, as shown, with the valve in one extreme position, whereas a depression of the treadle will shift the valve to its other extreme position.

From the foregoing description, it will be seen that I have provided a convenient and practical means for controlling power driven mechanism by hydraulic pressure. The means for developing the pressure is driven from the same power shaft which drives the mechanism to be controlled so that the entire controlling device is embodied in a self contained unit which may be readily attached to any power driven mechanism and is not dependent for its operation upon any other source of power.

While I have shown and described in detail one embodiment of the invention it is obvious that the same may be considerably modified without departing from the scope of the appended claims. It will also be understood that the invention may be used in connection with any power driven mechanism having a brake for controlling its operation.

What I claim is:

1. In a power press, a drive shaft, power press operating mechanism, a clutch for connecting the drive shaft to said mechanism, a brake for said mechanism, a spring normally operable to set the brake, means operable by fluid pressure in opposition to said spring to release the brake, a fluid pump driven by said shaft, a pipe line from the pump outlet to said fluid pressure operable means, a normally closed valve in said line, manually operable means for opening said valve to release the brake, means associated with said valve to drain fluid from the fluid pressure operable means to set the brake when said valve is closed, and a relief valve to limit the pressure in said pipe line.

2. In a power press, a rotatable driven member, a brake for said member, a piston operatively connected with said brake, a cylinder in which said piston operates, a spring acting on said piston to hold the brake normally set, a fluid tank, a pump driven from the same source as said driven member, pipe lines connecting the pump inlet with said tank and the pump outlet with said cylinder, a by-pass with a relief valve connecting the outlet line with the tank, a normally closed control valve in said outlet line between the by-pass and the cylinder and adapted to be opened to admit fluid under pressure to said cylinder, and means to return the fluid from the cylinder to the tank when said control valve is closed.

3. In a power press, a shaft, a drum secured to said shaft, a brake for said drum, a toggle shiftable to engage or disengage the brake, a reciprocable member to shift said toggle, yieldable means normally holding said reciprocable member in one extreme position, fluid pressure means to shift the reciprocable member to its opposite extreme position in opposition to said yieldable means, a normally closed valve in the fluid pressure line to cut off the fluid pressure from said reciprocable member, and means to release the fluid pressure from said reciprocable member when said valve is closed.

In testimony whereof I have hereunto signed my name to this specification.

LARKIN R. WILLIAMSON.